April 11, 1961 — L. F. DAVIES — 2,978,803
HAND PRESS FOR INSTALLING BUSHINGS IN EXCAVATOR BOOMS AND THE LIKE
Filed March 26, 1957 — 2 Sheets-Sheet 1

INVENTOR.
LESTER F. DAVIES
BY
Lindsey and Prutzman
ATTORNEYS

April 11, 1961

L. F. DAVIES 2,978,803

HAND PRESS FOR INSTALLING BUSHINGS IN
EXCAVATOR BOOMS AND THE LIKE

Filed March 26, 1957

INVENTOR.
LESTER F. DAVIES

BY

Lindsey and Prutzman
ATTORNEYS

United States Patent Office 2,978,803
Patented Apr. 11, 1961

2,978,803

HAND PRESS FOR INSTALLING BUSHINGS IN EXCAVATOR BOOMS AND THE LIKE

Lester F. Davies, Windsor, Vt., assignor to Cone Automatic Machine Company Inc., Windsor, Vt., a corporation of Vermont Filed Mar. 26, 1957, Ser. No. 648,684

3 Claims. (Cl. 29—282)

This invention relates to hand presses and more particularly to a novel and improved hand press for installing bushings in excavator booms and the like.

It is the object of this invention to provide a novel and improved hand press for installing bushings in excavator booms and the like which is particularly suitable for use in environments where working space is at a minimum; which is adapted to install bushings of varying sizes and particularly those of substantial length; and which is simple and economical to fabricate, yet which is rugged to assure extended trouble-free use in the field.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figures 1, 2:
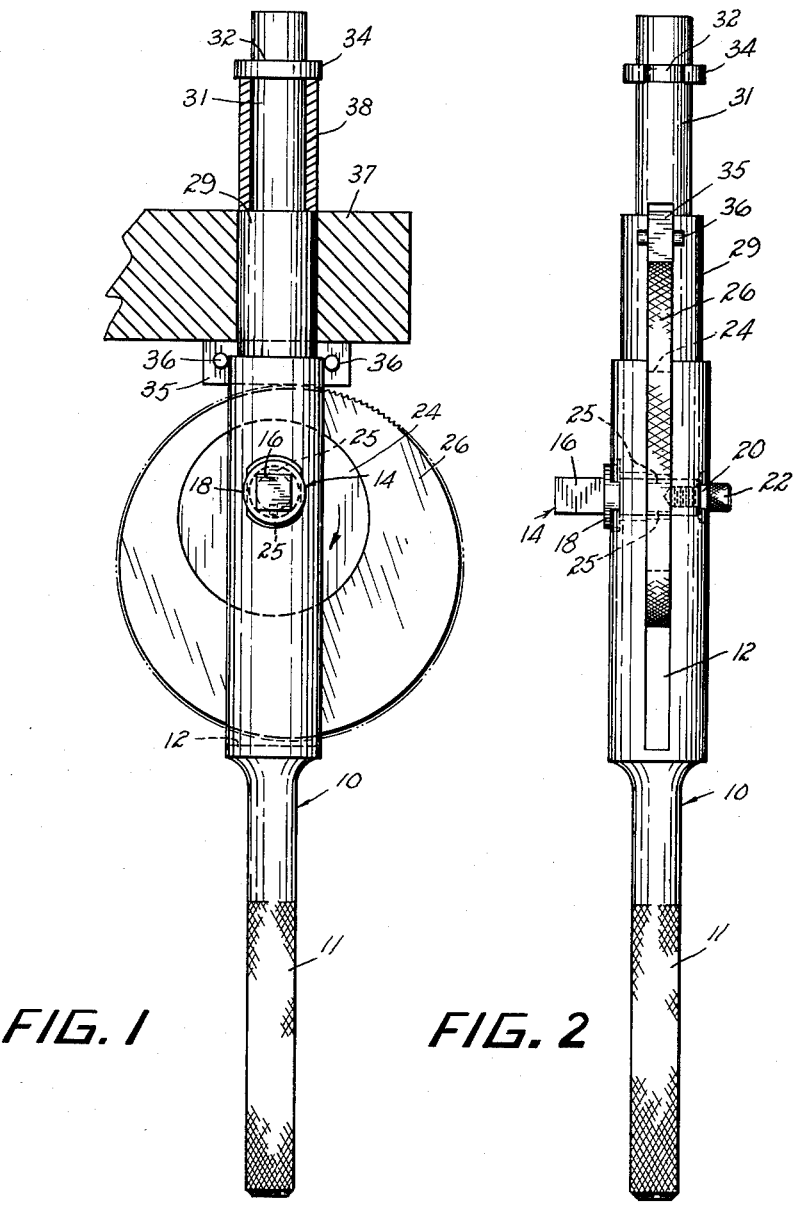
Fig. 1 is a front elevational view of a hand press, constructed in accordance with the invention, engaged with an excavator boom and bushing, shown in section, preparatory to installing the bushing.
Fig. 2 is a side elevational view of the hand press of Fig. 1.

With reference to the drawings, a hand press constructed in accordance with the invention, comprises a cylindrical shank 10, having a reduced end portion 11 which serves as a handle for the tool. The shank is provided intermediate its ends with a slot 12 extending diametrically therethrough and axially thereof. A stud 14 having a wrench engageable fitting 16 at one end is rotatably mounted on the shank and extends at right angles to the slot 12. A shoulder 18 on one end of the stud received within a recess in the shank and a washer 20 retained on the other end of the stud by a screw 22 and received in a recess in the shank, secure the stud against axial movement in either direction.

A circular cam 24 is received within the slot 12 and is eccentrically mounted on the stud 14. A pair of keys 25 provide a driving connection between the stud and cam 24, whereby rotation of the stud will result in rotation of the cam. An outer circular cam 26 is also rotatably received in the slot 12 and is provided with a circular aperture, offset from the center thereof, in which the inner cam 24 is engaged for rotation relative to the outer cam.

The shank is reduced in diameter at its outer end at 29 and again at 31 for insertion through a boom and bushing and the reduced end portion 31 is provided with an external annular groove 32. A split collar 34, engageable with the outer end of a bushing on the shank, is removably receivable in the groove 32. The collar 34 may be of any size consistent with the diameter of the bushing which it is desired to install. Slidably mounted in the slot 12 and disposed between the outer cam 24 and collar 34 is a rectangular block 35 which is retained in the slot by means of a pair of pins 36 on the opposite ends of the block.

In the use of a hand press, constructed in accordance with the invention, the inner cam 24 is rotated to the position of Fig. 1 wherein its shortest throw extends axially of the shank and toward the block 35. The outer end of the shank, as can be seen in Fig. 1 is then inserted through the hole in the boom 37 in which the bushing 38 is to be inserted. The bushing is mounted on the outer reduced end 31 of the shank in abutment with the shoulder formed by the juncture of the reduced end portions 29 and 31 and the collar 34 engaged in the groove 32. The outer cam 26 is manually rotated to bring the block 35 into firm engagement with the boom 37. The periphery of the outer cam 26 is preferably knurled to prevent slipping of the outer cam relative to the block 35.

Figure 3:
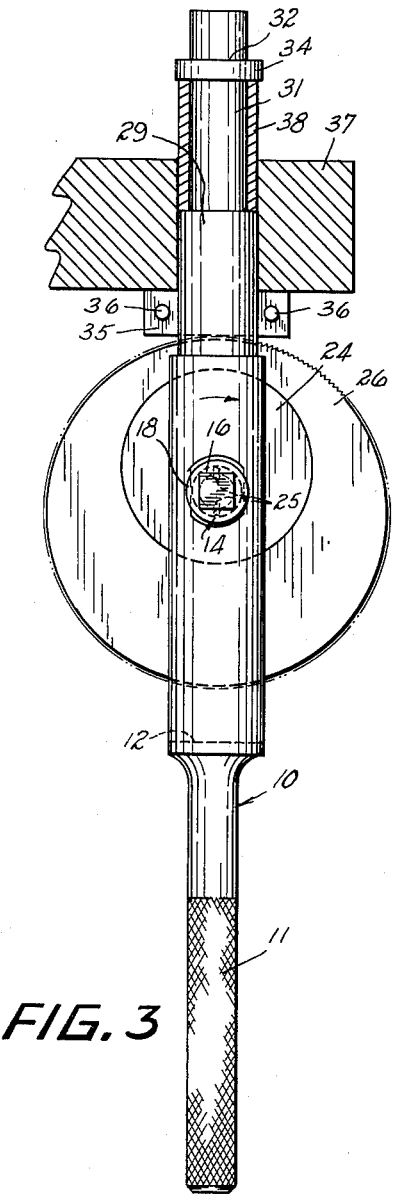
Fig. 3 is an elevational view similar to Fig. 1, with the press having been operated to partially draw the bushing into the boom.
Figure 4:
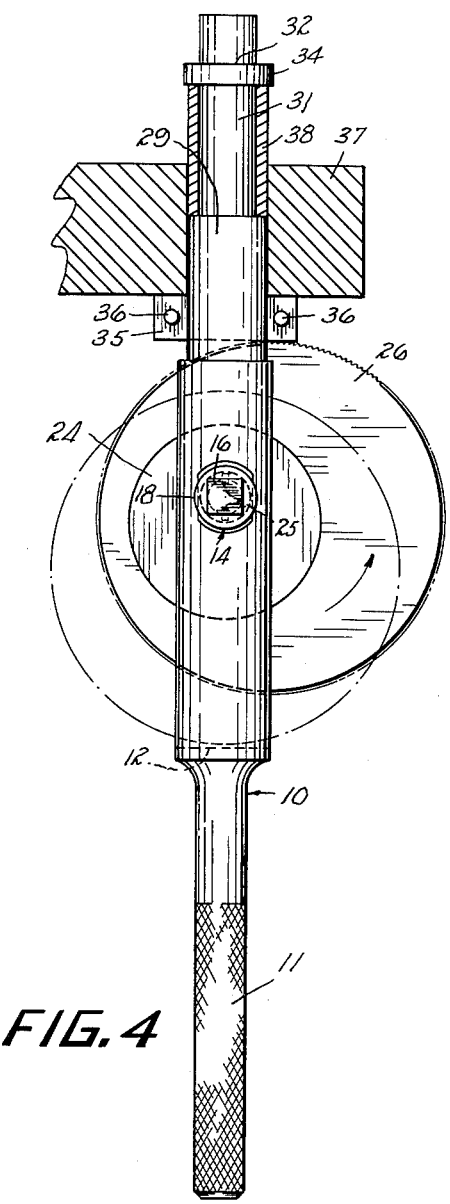
Fig. 4 is an elevational view similar to Fig. 3 illustrating resetting of the tool preparatory to further installation of the bushing.

The stud 14 is then engaged by a suitable tool, such as a wrench, to rotate the inner cam in the direction of the arrow of Fig. 1, and relative to the outer cam, until the maximum throw of the inner cam 24 extends axially of the shank toward the block 35. This rotation of the inner cam relative to the outer cam will result in relative movement of the block 35 and collar 32, whereby the bushing will be drawn at least partially into the boom by the collar as shown in Fig. 3. The length of the bushing and the extent of throw of the inner cam will, of course, determine the extent of insertion of the bushing within the boom for one cycle of operation of the tool. To draw the bushing further into the boom, the inner cam is rotated in the direction of the arrow of Fig. 3 to the position shown in Fig. 4, wherein its minimum throw is in alignment with the shank and extending toward the block. The outer cam will at the same time be moved away from the block 35. The outer cam is rotated in the direction of the arrow of Fig. 4 to bring its periphery into engagement with the block and to engage the collar with the bushing. The inner cam is then rotated in the direction of the arrow of Fig. 4 so as to draw the bushing further into the boom. This operation may be repeated, as is necessary, to fully install the bushing.

The tool, described above and constructed in accordance with the invention is portable and easily handled and will provide the high forces necessary to install bushings and the like. The tool is relatively small, thus permitting its use in places where working space is at a minimum. It is simple and economical to fabricate, having relatively few parts, yet it is rugged and will assure extended trouble-free use in the field even under adverse conditions.

I claim:

1. A hand press for installing bushings in openings of a member, comprising a shank adapted to extend through the opening, a first cam parallel to said shank having an aperture offset from the center thereof, a second cam received in said aperture and eccentrically mounted on said shank for rotation about a fixed axis perpendicular to said shank, the cam surface of the second cam being in contact with the entire periphery of the aperture of the first cam, retaining means on the tool adjacent one end of the shank adapted to retain a bushing thereon, a block slidably mounted on said shank between said first cam for engagement therewith and said retaining means and adapted to abut the member, and means to rotate said second cam, the first cam being rotatable about the second cam for adjusting movement of the block relative to the retaining means and against the surface of the member to place an associated bushing in contact with the member and in alignment with the opening therein and thereafter movable by the eccentric camming rotation of said second cam to move said block relative to said retaining means, thereby drawing a bushing into the opening.

2. A hand press for installing bushings in openings of a member, comprising a shank having an elongated slot extending axially thereof and adapted to extend through the opening in which a bushing is to be inserted; a first circular cam rotatable in said slot and having a circular aperture offset from the center thereof; a second circular cam received in said aperture and eccentrically mounted in said slot for rotation about a fixed axis, said first cam being rotatable about said second cam with the camming surface of the second cam in contact with the entire periphery of the aperture of the first cam, a removable collar mounted adjacent one end of said shank and adapted to retain a bushing thereon; a block slidably mounted in said slot between said first cam and said collar and adapted to abut the member; and means to rotate said second cam, the first cam being rotatable about the second cam for adjustable movement of the block relative to the collar to abut the member and place an associated bushing in tight contact with the member and in alignment with the opening therein and thereafter movable by the eccentric camming rotation of said second cam to further move said block relative to said collar, thereby drawing the bushing into the opening.

3. A hand press for installing bushing in openings of a member, comprising a shank having an elongated slot extending axially thereof and a handle portion at one end, said shank being adapted to extend through the opening in which a bushing is to be inserted; a first circular cam rotatable in said slot and having a circular aperture offset from the center thereof; a second circular cam received in said aperture, said second cam being in contact with the entire periphery of the aperture in said first cam; a stud rotatably journalled on said shank and on which the second cam is eccentrically mounted, said stud having a wrench-engageable end portion for imparting rotation thereto; a collar removably mounted adjacent the other end of said shank adapted to retain a bushing thereon; and a block slidably mounted in said slot between said first cam and said collar and adapted to abut the member, the first cam being rotatable about the second cam for adjusting movement of the block relative to the collar to abut the member and place the bushing in tight contact with the member in alignment with the opening therein and thereafter moveable by the eccentric camming rotation of said second cam to further move said block relative to said collar, thereby drawing the bushing into the opening.

References Cited in the file of this patent
UNITED STATES PATENTS

| | | |
|---|---|---|
| 1,321,627 | Hagstrom | Mar. 11, 1919 |
| 1,400,783 | Abernathy | Dec. 20, 1921 |
| 2,094,779 | Donaldson | Oct. 5, 1937 |
| 2,682,103 | Hamilton | June 29, 1954 |

FOREIGN PATENTS

| | | |
|---|---|---|
| 768,385 | France | Aug. 4, 1934 |